United States Patent
Noble et al.

(10) Patent No.: US 6,201,920 B1
(45) Date of Patent: Mar. 13, 2001

(54) FIBER OPTIC CABLE WALL MOUNT HOUSING

(75) Inventors: Jennifer D. Noble, Fort Worth; Carrie Lynn Elder, Sagunaw, both of TX (US)

(73) Assignee: Siecor Operations, LLC, Hickory, NC (US)

( * ) Notice: Subject to any disclaimer, the term of this patent is extended or adjusted under 35 U.S.C. 154(b) by 0 days.

(21) Appl. No.: 09/222,584

(22) Filed: Dec. 28, 1998

(51) Int. Cl.[7] ....................................................... G02B 6/00
(52) U.S. Cl. ............................................. 385/134; 385/135
(58) Field of Search ................................... 385/134–138

(56) References Cited

U.S. PATENT DOCUMENTS

| 4,898,448 | * | 2/1990 | Cooper | 385/135 |
| 5,109,467 | * | 4/1992 | Hogan et al. | 385/135 |
| 5,497,444 | * | 3/1996 | Wheeler | 385/135 |

OTHER PUBLICATIONS

Siecor Premises Fiber Optic Products Catalog, Sixth Edition; Siecor Corporation; Apr., 1996; Portions 2.29, 2.22, 2.25, 2.27, 2.42, 2.48.

* cited by examiner

Primary Examiner—Frank G. Font
Assistant Examiner—Sang Hoang Nguyen

(57) ABSTRACT

A fiber optic connector unit has a housing with a provider port and a customer port. The ports provide access for fiber optic cables. A fiber optic connector panel is mounted inside the housing. The connector panel has apertures for mounting connectors to optically interconnect the fibers of a provider cable with the fibers of a customer cable. A slack holder is mounted in the housing for being wrapped with slack of the provider cable. Curved guide walls are located adjacent to the slack holder and adjacent to the provider and customer sides of the connector panel for guiding fibers without excessively bending them.

21 Claims, 4 Drawing Sheets

FIBER OPTIC CABLE WALL MOUNT HOUSING

TECHNICAL FIELD

This invention relates in general to housing units for containing fiber optic connections and in particular to a housing unit that has guide walls to prevent excessive bending of the optical fibers within the housing.

BACKGROUND ART

Fiber optic cables are used for transmitting voice, data and video communications. In a typical installation, a provider cable will extend to a connector unit or center at the user's facility. This unit includes a housing that may be mounted to a wall. The provider optical cable contains a bundle of individual fibers, each fiber transmitting optical signals. The provider cable passes through a provider port in the housing and the individual fibers, having connectors on the ends of the fibers, mount to adapters in a connector panel. The connector panel has a plurality of apertures, one for each connector/adapter. A customer fiber cable leads from various work stations to the housing through a customer port and optically connect with the provider fibers at the connector panel.

It is standard procedure to provide adequate slack for the provider cable to allow for reorganization of the connectors and to replace connectors later if needed. Normally slack is provided by the use of pigtail extensions that are spliced to the ends of the provider fibers. A slack holder is mounted in the housing for being wrapped with the slack.

It is important to avoid bending the fibers more than a specified radius, normally 1.25 to 1.5 inches. The housings are provided with space surrounding the slack holder to allow the installer to accomplish installation without excessive bending. However, avoiding excessive bending relies upon the skill of the installer.

DISCLOSURE OF INVENTION

In this invention, guide walls are provided within the housing to substantially eliminate any possibility of excessive bending of the fibers. The slack holder has at least one guide wall mounted in the housing next to it. The guide wall has a curved portion to guide the fibers of the provider cable to and from the slack holder. The connector panel has a connector panel guide wall mounted in the housing next to the connector panel. The panel guide wall also has a curved portion to guide the fibers of the provider cable to the panel without excessive bending. Similarly, a customer cable guide wall is located between the customer port and the customer panel. The customer cable guide wall has a curved portion to guide the fibers of the customer cable from the customer port to the customer side of the connector panel.

The guide walls are mounted to a back wall of the housing and extend orthogonally from the back wall. The provider and customer ports for the provider and customer fiber optic cables are located in side walls of the housing. A splice tray compartment is located between the connector panel and the provider port for receiving splice trays that splice pigtail extension fibers to the fibers of the provider cable. The splice tray compartment also has a splice tray guide wall with a curved portion for guiding the fibers to and from the splice tray compartment.

BEST MODE FOR CARRYING OUT THE INVENTION

Figure 1:
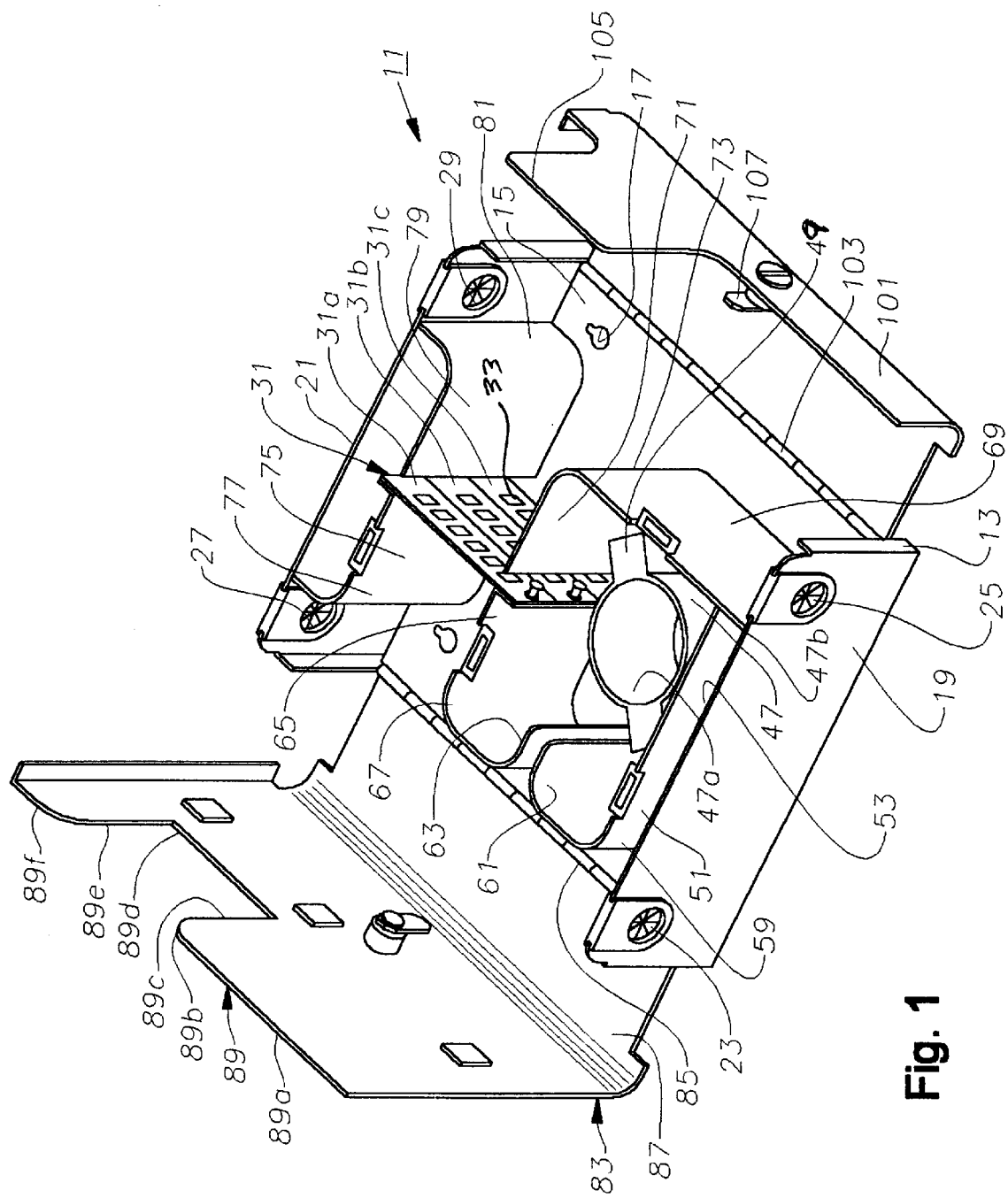
FIG. 1 is an isometric view of a fiber optic connector unit constructed in accordance with the invention and shown with the covers open.

Referring to FIG. 1, wall mount unit 11 includes a rectangular housing 13. Housing 13 has a rectangular back plate 15 that has a pair of holes 17 for mounting housing 13 to a wall. Housing 13 has first and second side walls 19, 21 that are located at opposing edges of back plate 15. Side walls 19, 21 are orthogonal to back plate 15.

First side wall 19 has a provider port 23 located near one end and a customer port 25 located near the other end. Preferably, ports 23, 25 have conventional strain relief devices within them. Similarly, second side wall 21 has a provider port 27 near one end and a customer port 29 near the other end.

Figure 2:
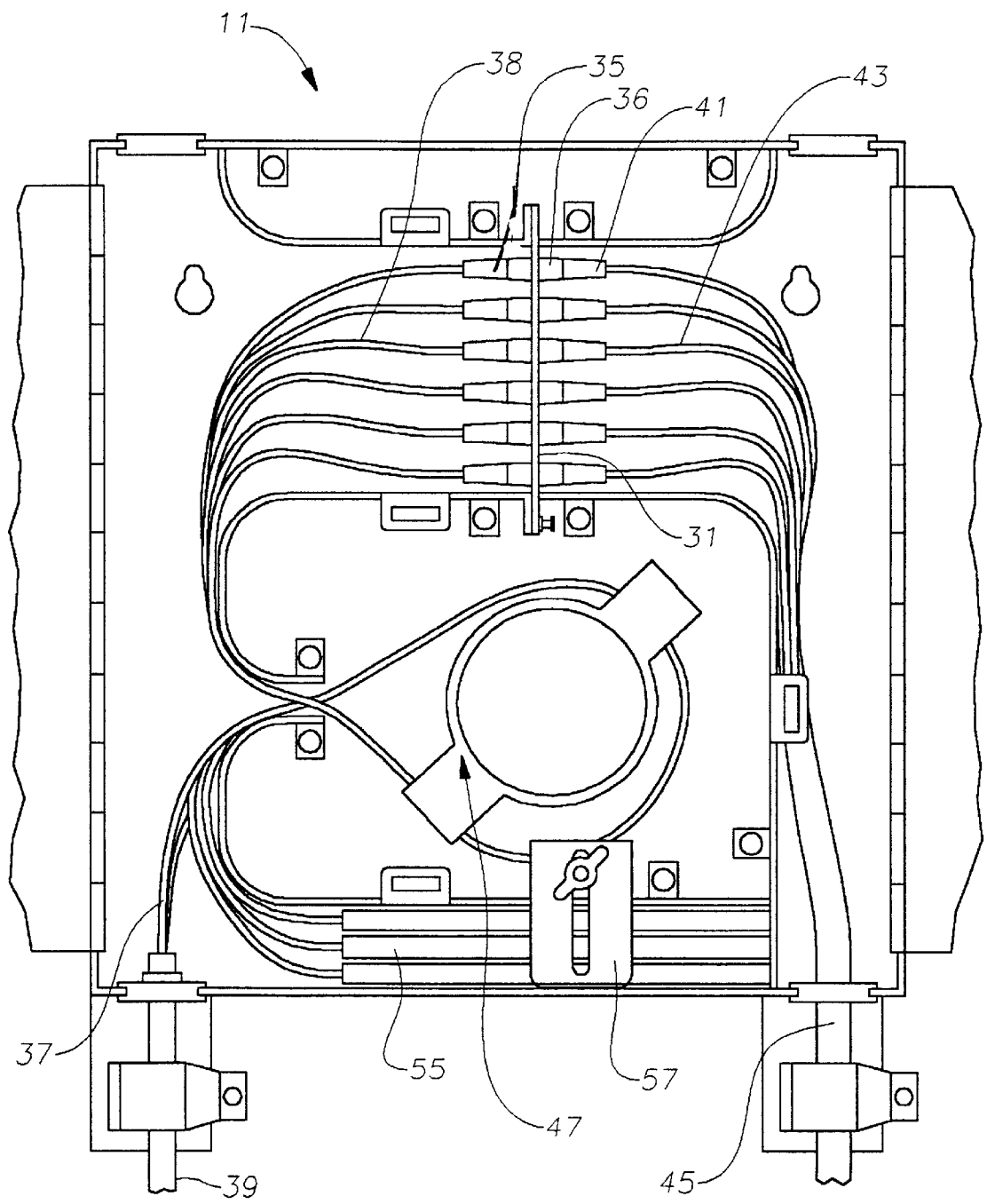
FIG. 2 is a front view of the connector unit of FIG. 1, showing optical fibers installed therein.

A connector panel 31 comprises a plurality of connector panel sections 31a, 31b, 31c, mounted side-by-side in a single plane, each having a plurality of apertures 33. Connector panel sections 31a–c are mounted orthogonally to back plate 15 and perpendicular to side walls 19, 21. Alternately, panel sections 31a–c could be a single connector panel with any appropriate arrangement or number of apertures 33. Connector panel sections 31a–c are located closer to second side wall 21 than first side wall 19 and is equidistant between opposite side edges of back plate 15. As shown in FIG. 2, fiber optic connectors 35 mount to apertures 33 through adapters 36. Each connector 35 is connected to a fiber associated with a provider cable 39. In the embodiment of FIG. 2, each fiber 37 of provider cable 39 has a pigtail extension 38 connected to it, and each connector 35 is connected to one of the pigtail extensions 38. Provider cable 39 comprises a bundle of individual optical fibers 37 encased in a sheath and leads to unit 11 from a telecommunications company. Connectors 41 of customer fibers 43 will be received within the adapters 36 for optically connecting provider fibers 37 with customer fibers 43. Customer fibers 43 are bundled in a customer cable 45 and lead to various work stations.

Provider fibers 37 installed according to specifications will have slack. This allows the installer to cut off the end of fibers 37 or their extensions 38, if used, and connect new connectors 35 if connectors 35 become defective. The slack is wrapped around a slack holder 47. Slack holder 47 is located between one edge of connector panel 31 and first side wall 19. Slack holder 47 has two curved surfaces 47a, 47b that face away from each other for being wrapped with slack of provider fibers 37. In the embodiment shown, surfaces 47a, 47b join together and form a cylindrical stationary reel configuration. However, surfaces 47a, 47b could be spaced apart from each other to form either a circular or oval shape, so long as the minimum bend radius of the optical fibers is not violated when the optical fibers are wrapped around it. Slack holder 47 is mounted to back wall 15 and has flanges 49 that are located in a plane parallel to back wall 15. Flanges 49 retain wraps of provider fibers 37 and their extensions 38 as shown in FIG. 2.

A splice tray guide wall 51 has a straight portion that is parallel to first side wall 19 and spaced from it. Guide wall portion 51 is mounted to back wall 15 and protrudes approximately the same depth as side walls 19, 21. Splice tray guide wall portion 51 defines a splice tray compartment 53 between it and first side wall 19. Splice tray compartment 53 is used to hold conventional splice trays 55 as shown in FIG. 2. Splice trays 55 are held within splice tray compartment 53 by bracket 57. Splice trays 55 are used to connect pigtail extensions 38 to provider fibers 37. Pigtail extensions 38 are commonly connected to provider fibers 37 during initial installation to provide an adequate amount of slack. Each splice tray 55 has one fiber 37 from provider cable 39 extending into it with the extension 38 to each fiber 37 being joined therein and extending outward from it on the same end of splice tray 55. Provider fibers 37 have enough length beyond the sheath to extend from provider port 27 around slack holder 47 and then to one of the splice trays 55 in splice tray compartment 53. Pigtail extension fibers 38 extend from splice tray 55, back around slack holder 47 and from there into connector panel 31.

To avoid excessively bending provider fibers 37 their extensions 38, a curved portion 59 is located on one end of the straight portion of splice tray guide wall 51. Similarly, a curved slack holder guide wall 61 is mounted adjacent slack holder 47 for guiding provider fibers 37 and their extensions 38 to and from slack holder 47. In the embodiment shown, slack holder guide wall 61 joins curved portion 59 of slice tray guide wall 51. However, guide wall portions 61 and 59 could be separate from each other.

A second slack holder guide wall 63 is located next to slack holder guide wall 61. Slack holder guide wall 63 is also curved, with the two guide walls 61, 63 curving asymptotically away from each other. A slot is defined between guide walls 61, 63. The slot is on a line that bisects slack holder 47.

A provider guide wall 65 is located on one side of connector panel 31. Provider guide wall 65 has a straight portion that is parallel with first side wall 19 and a curved portion 67. Curved portion 67 joins slack holder guide wall 63 in the embodiment shown, although they could be separate. Curved portion 67 prevents excessive bending of provider fibers 37 or their extensions 38 in the space between slack holder 47 and connector panel 31.

A customer guide wall has a straight portion 69 extending orthogonally from first side wall 19 next to customer port 25. The customer guide wall has a second straight portion 71 that is perpendicular to the first portion 69 and to connector panel 31 and is joined to straight portion 69 by curved portion 73. Curved portion 73 prevents excessive bending of customer fibers 43 (FIG. 2). Thus, guide wall portions 51, 59, 61, 63, 65, 67, 69, 71 and 73 form an enclosure around slack holder 47, preventing the user from accessing provider cable fibers 37.

In addition to or alternately of ports 23, 25, a customer may wish to install provider and customer cables in ports 27, 29 in second side wall 21. To avoid excessive bending of the fibers entering through second side wall 21, a provider guide wall 75 joins panel 31 and extends parallel to provider guide wall 65 and toward port 27. Provider guide wall 75 has a curved portion 77 that curves away from the interior of housing 13 and connector panel 31 and joins second side wall 21. Similarly, a customer guide wall 79 extends from panel 31 on the customer side of housing 13. Customer guide wall 79 has a straight portion parallel to second side wall 21 and a curved portion 81 that curves away and joins second side wall 21 near port 29.

The guide wall curved portions 59, 61, 63, 67, 73, 77, and 81 are all formed having a radius that is at least as large as the minimum bend radius for the particular optical fiber. Typically the radius is about 1.25 to 1.5 inches. Guide wall curved portions 59, 61, 63, 67, 73, 77, and 81 extend through about 90 degrees in the preferred embodiment but could extend through other angles, depending on the configuration of the housing.

A provider cover 83 is connected by a hinge 85 to one side edge of back plate 15. Provider cover 83 is used to enclose what is considered to be the provider portion of unit 11. Provider cover 83 has an L-shaped cross-section with a side wall portion 87 connected to a hinge 85. The front of cover 83 extends to an edge 89 that is contoured to terminate at the dividing line between the provider and the customer portions of unit 11. Edge portion 89*a* is flush with customer guide wall 69. Edge portions 89*b* and 89*f* are curved and lead to a rectangular notch formed by edge portion 89*c*, 89*d* and 89*e*. Edge portion 89*b* overlies customer curved guide wall portion 73. Edge portion 89*c* is flush with customer guide wall portion 71. Edge portion 89*d* is flush with panel 31. Edge portions 89*e* and 89*f* are flush with customer panel guide walls 79 and 81.

Similarly, a customer cover 101 is connected by hinge 103 to an opposite edge of back plate 15. Customer cover 101 encloses the customer portion of unit 11. Customer cover 101 has an edge 105 that is contoured to mate with edge 89. Locks 107 enable each cover 83 and 101 to be separately locked. When provider cover 83 is locked, there is no access to the provider side of connector panel 31. The shape of the provider and customer covers 83, 101 may be of any shape, depending on the specific orientation of the internal components of housing 13.

In a typical installation, the installer will insert provider cable 39 (FIG. 2) through provider port 23. If pigtail extensions 38 are to be used, he will connect pigtail extensions 38 to provider fibers 37 using splice trays 55 (FIG. 2). The installer will insert splice trays 55 in splice tray compartment 53 and secure them with bracket 57. Excess slack from provider fibers 37 and their extensions 38 will be wrapped around slack holder 47. Pigtail extensions 38 are terminated with connectors 35 that the installer inserts into adapters 36 in connector panel 31. If desired, provider cover 83 could be closed and locked at that point. An installer will insert customer fiber cable 45 into customer port 25. The ends of customer fibers 43 have connectors 41 that plug into adapters 36. Cover 101 may then be closed.

Figure 3:
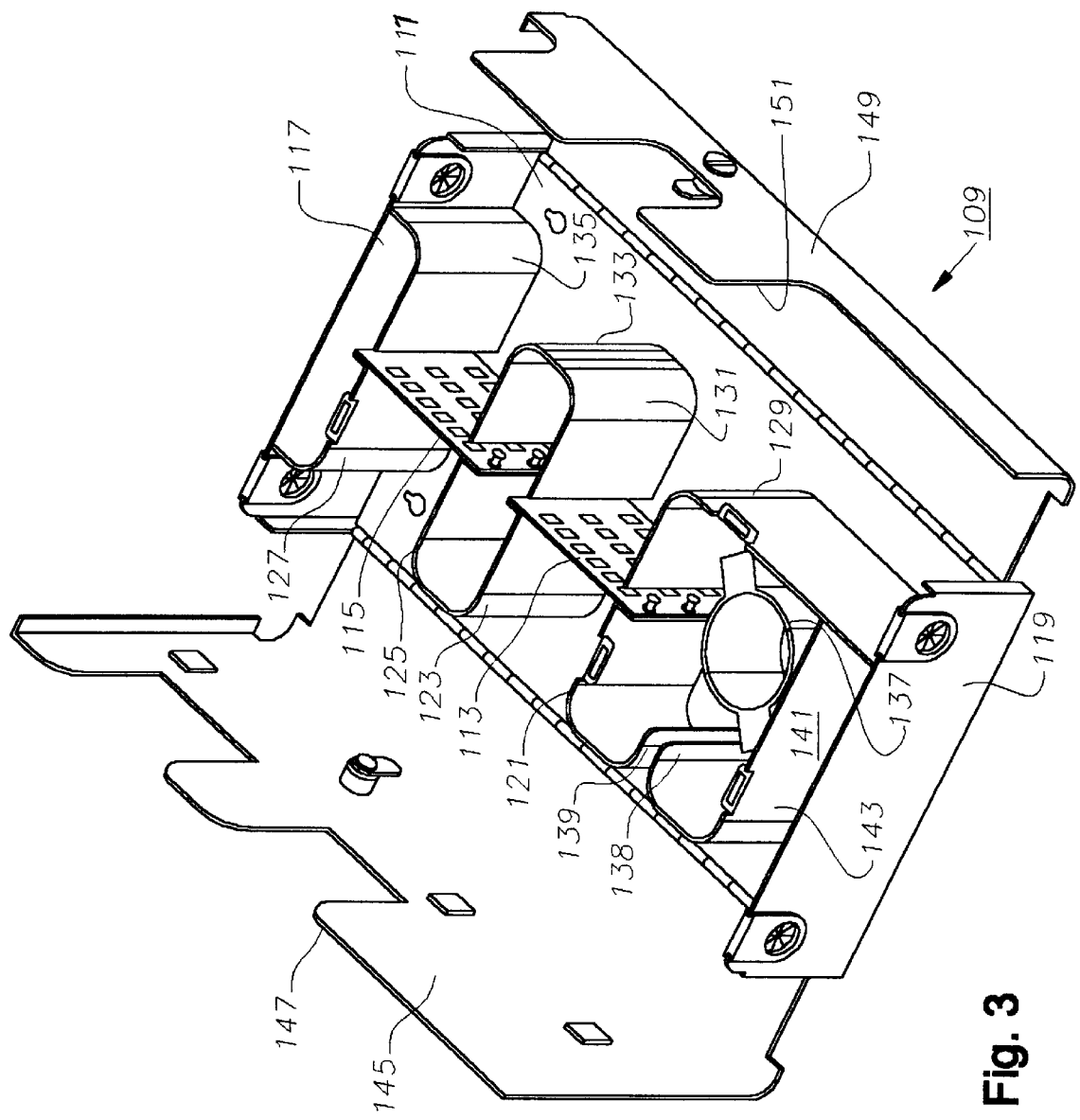
FIG. 3 is a perspective view of a second embodiment of a fiber optic connector unit constructed in accordance with this invention.

Unit 109 of FIG. 3 is similar to the first embodiment, having a rectangular housing 111. It differs primarily in that it has two spaced-apart connector panel sections 113, 115 rather than one. Each connector panel 113, 115 will have three panel sections in the same manner as panel sections 31*a*, 31*b* and 31*c* of the first embodiment. Again, the separate panel sections of each connector panel 113, 115 could be a singular unit. Connector panels 113, 115 are located in a single plane that bisects housing 111 into a provider side and a customer side. Panels 113 and 115 are perpendicular to opposite side walls 117, 119.

In the same manner as previously described, guide walls are provided to avoid excessive bending. First panel 113 has guide walls 121, 123 that have curved portions. Second panel 115 has spaced apart guide walls 125, 127 that have curved, flared out portions. On the customer side, guide walls 129, 131 extend from first connector panel 113. Guide walls 133, 135 extend from second panel 115. Customer guide walls 129, 131, 133 and 135 all have curved portions.

Slack holder 137 is configured as in the first embodiment. It has guide walls 138, 139 with curved portions. A splice tray compartment 141 is located between slack holder 137 and first side wall 119. Provider cover 145 has edge 147 contoured to be flush with guide walls 129, 131, 133, 135 and the two panels 113, 115. Customer cover 149 has an edge 151 that mates with edge 147. Unit 109 is installed generally as described in connection with the first embodiment.

Figure 4:
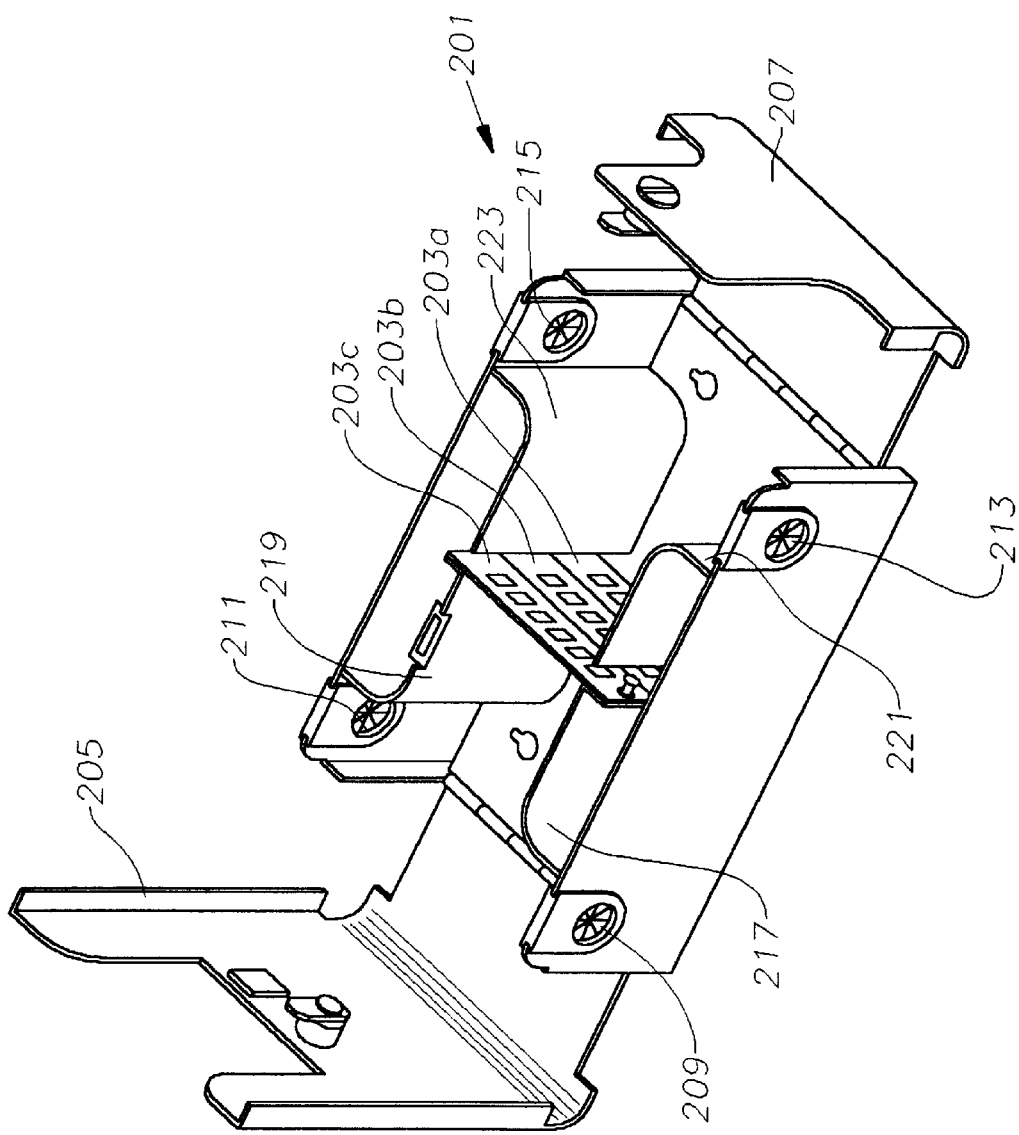
FIG. 4 is a perspective view of a third embodiment of a fiber optic connector unit constructed in accordance with this invention.

Shown in FIG. 4 is a third embodiment of the unit. This embodiment has fewer connections for the optical fibers and does not include either a fiber optic slack holder nor splice tray holder as in the previous embodiments. Housing 201 has one area for two connector panel sections 203a, b which are mounted in contact with each other in a single plane. A top panel section 203c is primarily for spacing purposes and has alignment and key slots to allow panel covers 205, 207 to be locked. As with the previous embodiments, housing 201 has provider ports 209, 211 and customer ports 213, 215. The fibers from each of the ports 209, 211, 213, 215 are guided around curved surfaces 217, 219, 221, 223, respectively to panel sections 203a, b. This installation is used when there are fewer optical fibers and there is no need for slack storage or for splice trays. As with the housings of the other embodiments, housing 201 is so designed that the installer and the users cannot accidentally violate the bend radius of the optical fibers in routing them from the ports to the panel sections.

The invention has significant advantages. The various curved guide walls are positioned in strategic places to minimize any possibility of an installer bending fibers excessively. The guide walls also separate the slack holder area, the panel area and the splice area. This organizes the unit, reducing the chances for mistakes. The fibers flow along a planned path making for easier installation and a cleaner system.

While the invention has been shown in only three of its forms, it should be apparent to those skilled in the art that it is not so limited, but is susceptible to various changes without departing from the scope of the invention.

We claim:

1. A fiber optic connector unit, comprising:
   a housing;
   at least one provider port in the housing for the entry of a fiber optic provider cable having a plurality of optical fibers;
   at least one customer port in the housing for the entry of a fiber optic customer cable having a plurality of optical fibers;
   at least one fiber optic connector panel mounted in the housing, the connector panel having a plurality of apertures for mounting connectors to optically interconnect the fibers of the provider cable with the fibers of the customer cable;
   at least one provider guide wall mounted in the housing adjacent the connector panel, the provider guide wall being curved along at least a portion to guide the fibers of the provider cable to the connector panel; and
   a customer cable guide wall located between the customer port and the connector panel, the customer guide wall being curved along at least a portion to guide the fibers of the customer cable to the connector panel.

2. The unit according to claim 1, wherein:
   the housing has a back wall and a pair of side walls;
   the provider port is located in one of the side walls; and
   the guide walls extend from the back wall.

3. The unit according to claim 1, further comprising:
   a slack holder mounted in the housing for being wrapped with slack of the provider cable; and
   at least one slack holder guide wall mounted in the housing adjacent the slack holder, the slack holder guide wall having a curved portion to guide the fibers of the provider cable to and from the slack holder.

4. The unit according to claim 3, wherein the slack holder is located between one side of the slack holder guide wall and the customer guide wall.

5. The unit according to claim 3, wherein said at least one slack holder guide wall comprises a pair of slack holder guide walls, each having curved portions that are spaced apart and opposed to each other, providing a slot for the passage of the fibers of the provider cable to and from the slack holder.

6. The unit according to claim 1, wherein the customer guide wall has first and second straight portions that are joined by the curved portion of the customer guide wall.

7. The unit according to claim 1, further comprising:
   a splice tray compartment located between the connector panel and the provider port for receiving splice trays; and
   the splice tray compartment having a splice tray guide wall, the splice tray guide wall being curved along at least a portion thereof for guiding fibers to and from the splice tray compartment.

8. The unit according to claim 1, wherein:
   said at least one fiber optic connector panel comprises a pair of the connector panels; and
   said at least one provider guide wall comprises a pair of the provider guide walls, one of the provider guide walls located adjacent each of the connector panels.

9. A fiber optic connector unit, comprising:
   a housing having a back wall and first and second opposing side walls;
   a provider port in the first side wall of the housing for the entry of a fiber optic provider cable having a plurality of optical fibers;
   a customer port in at least one of the side walls of the housing for the entry of a fiber optic customer cable having a plurality of optical fibers;
   at least one fiber optic connector panel mounted in the housing, the connector panel having a plurality of apertures for mounting connectors to optically interconnect the fibers of the provider cable with the fibers of the customer cable;
   at least one provider guide wall mounted to the back wall of the housing between the connector panel and the provider port, the provider guide wall being curved along at least a portion to guide the fibers of the provider cable to the connector panel; and
   at least one customer cable guide wall located between the customer port and the connector panel, the customer cable guide wall being curved along at least a portion to guide fibers of the customer cable from the customer port to the connector panel.

10. The unit according to claim 9, further comprising:
    a slack holder mounted to the back wall of the housing, the slack holder having oppositely facing curved surfaces for being wrapped with slack of the provider cable and a flange for retaining the slack on the oppositely facing curved surfaces;
    a splice tray guide wall mounted to the back wall of the housing between the slack holder and the first side wall, defining a splice tray compartment between the first side wall and the slack holder for receiving splices of the fibers of the provider cable to pigtail extension fibers, the splice tray guide wall having a curved portion curving away from the splice tray compartment to guide fibers from and to the splice tray compartment; and a pair of slack holder guide walls mounted to the back wall of the housing adjacent the slack holder, the slack holder walls having curved portions that oppose each other and curve generally asymptotically away from each other, defining a slot to guide the fibers to and from the slack holder.

11. The unit according to claim 10, wherein the splice tray guide wall has a straight portion substantially parallel to the first side wall.

12. The unit according to claim 10, wherein the curved portion of the splice tray guide wall is joined to one of slack holder guide walls, and the curved portion of the panel guide wall is joined to the other of the slack holder guide walls.

13. The unit according to claim 9, wherein the connector panel is mounted substantially perpendicular to the first side wall.

14. The unit according to claim 9, wherein the customer port is located in the first side wall adjacent one end of the first side wall, and the provider port is located adjacent an opposite end of the first side wall.

15. The unit according to claim 9, wherein the customer cable guide wall has a first straight portion substantially perpendicular to the first side wall and a second straight portion substantially parallel to the first side wall, the first and second straight portions being joined by the curved portion of the customer cable guide wall.

16. The unit according to claim 9, further comprising:
a second provider port in the second side wall of the housing for the entry of a second fiber optic provider cable; and a second provider guide wall located between the second provider port and the connector panel, the second provider guide wall being curved along at least a portion for guiding fibers from the second fiber optic provider cable to the connector panel.

17. The unit according to claim 9, further comprising:
a second customer port in the second side wall of the housing for the entry of a second fiber optic customer cable; and a second customer cable guide wall located between the second customer port and the connector panel, the second customer cable guide wall being curved along at least a portion for guiding fibers from the second fiber optic customer cable to the connector panel.

18. A fiber optic connector unit, comprising:
a housing having a rectangular back wall and first and second opposing side walls extending from first and second edges of the back wall, the back wall having third and fourth edges;

a provider port in the first side wall of the housing for the entry of a fiber optic provider cable having a plurality of optical fibers;

a customer port in the first side wall of the housing for the entry of a fiber optic customer cable having a plurality of optical fibers;

a fiber optic connector panel mounted to the back wall in the housing generally perpendicular to the first and second side walls and substantially equidistant between the third and fourth edges of the back wall, the connector panel having a plurality of apertures for mounting connectors to optically interconnect the fibers of the provider cable with the fibers of the customer cable;

at least one provider guide wall mounted to the back wall of the housing between the connector panel and the provider port, the provider guide wall being curved along at least a portion to guide the fibers of the provider cable to the connector panel; and at least one customer cable guide wall located between the customer port and the connector panel, the customer guide wall having a first straight portion extending orthogonally from the first side wall, a second straight portion extending orthogonally from the connector panel and a curved portion that joins the first and second straight portions to guide fibers of the customer cable from the customer port to the connector panel.

19. The unit according to claim 18, further comprising:
a slack holder mounted to the back wall of the housing between the connector panel and the first side wall, the slack holder having oppositely facing curved surfaces for being wrapped with slack of the provider cable and a flange for retaining the slack on the oppositely facing curved surfaces;

a splice tray guide wall mounted to the back wall of the housing between the slack holder and the first side wall, having a straight portion substantially parallel to the first side wall to define a splice tray compartment between the first side wall and the slack holder for receiving splices of the fibers of the provider cable to pigtail extension fibers, the splice tray guide wall having a curved portion curving away from the splice tray compartment and the first side wall to guide fibers from and to the splice tray compartment; and a pair of slack holder guide walls mounted to the back wall of the housing adjacent the slack holder, the slack holder walls having curved portions that oppose each other and curve generally asymptotically away from each other, defining a slot to guide the fibers to and from the slack holder.

20. The unit according to claim 18, further comprising:
a provider cover that is connected by a hinge to the housing to move between open and closed positions, the cover having a first straight edge portion that is perpendicular to the first side wall, a second straight edge portion that is parallel to the first side wall, and a curved edge portion that joins the first and second portions, such that while in a closed position, the first straight edge portion is flush with the first straight portion of the customer cable guide wall, the second straight edge portion is flush with the second straight portion of the customer cable guide wall, and the curved edge portion is flush with the curved portion of the customer cable guide wall; and a customer cover that is connected by a hinge to the housing opposite from the provider cover to move between open and closed positions independently of the provider cover, the customer cover having edge portions that are contoured to mate with the edge portions of the provider cover.

21. The unit according to claim 20, wherein the hinge of the provider cover is mounted to the third edge of the back wall of the housing and the hinge of the customer cover is mounted to the fourth edge of the back wall of the housing.

* * * * *